United States Patent
Lee, IV

(10) Patent No.: US 6,637,376 B2
(45) Date of Patent: Oct. 28, 2003

(54) INTENSITY VARIATION METHOD AND APPARATUS

(75) Inventor: Albert L. Lee, IV, Maryville, TN (US)

(73) Assignee: Radio Systems Corporation, Knoxville, TN (US)

(*) Notice: Subject to any disclaimer, the term of this patent is extended or adjusted under 35 U.S.C. 154(b) by 0 days.

(21) Appl. No.: 09/964,116

(22) Filed: Sep. 26, 2001

(65) Prior Publication Data

US 2003/0172880 A1 Sep. 18, 2003

(51) Int. Cl.[7] .................. A01K 15/02; A01K 15/04
(52) U.S. Cl. ............................. 119/719; 119/720
(58) Field of Search ................ 119/719, 720, 119/721

(56) References Cited

U.S. PATENT DOCUMENTS

| | | | |
|---|---|---|---|
| 4,802,482 A | 2/1989 | Gonda et al. ............... 119/719 |
| 4,947,795 A | 8/1990 | Farkas .................... 119/719 |
| 5,054,428 A | 10/1991 | Farkas .................... 119/719 |
| 5,353,744 A | 10/1994 | Custer .................... 119/719 |
| 5,815,077 A | * 9/1998 | Christiansen ............ 119/719 |
| 5,913,284 A | 6/1999 | Van Curen et al. ......... 119/720 |
| 6,073,589 A | 6/2000 | Van Curen et al. ......... 119/720 |
| 6,135,060 A | * 10/2000 | So ....................... 119/720 |
| 6,170,439 B1 | * 1/2001 | Duncan et al. ............ 119/720 |

* cited by examiner

*Primary Examiner*—Charles T. Jordan
*Assistant Examiner*—Elizabeth Shaw
(74) *Attorney, Agent, or Firm*—Pitts & Brittian, P.C.

(57) ABSTRACT

An apparatus and method for producing a variable intensity static stimulation. The variable intensity static stimulation increases in intensity if the animal continues to require correction. By varying the duty cycle of a periodic signal having constant amplitude and a constant duration, the intensity of the static stimulation is varied.

22 Claims, 4 Drawing Sheets

INTENSITY VARIATION METHOD AND APPARATUS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Scope of Invention

This invention relates to a method and apparatus for adjusting the intensity of an electromagnetic static stimulation applied to an animal as a deterrent. More specifically, this invention relates to a method and apparatus for adjusting the duty cycle of the static stimulation signal within a time window of fixed duration.

2. Description of the Related Art

In the field of electronic pet training, it is well known to apply a static stimulation to an animal as a stimulus. Animal trainers are aware that different animals have different tolerances to a static stimulation. In order to get the attention of the animal and discourage bad behavior, it is necessary to provide a sufficient level of static stimulation. By way of example, a smaller/less aggressive animal such as a poodle generally requires a static stimulation of less intensity than a larger/more aggressive animal to achieve the desired deterrent effect. While a single setting for intensity can be selected that is sufficient to gain the attention of any animal, such a setting would be unnecessarily harsh for a large number of animals.

In order to provide an appropriate level of stimulus to a variety of animals, it is desirable to steadily increase the level of stimulation to the animal while the animal continues to misbehave. By increasing the intensity of the applied stimulus until the behavior is corrected, the animal will learn to refrain from the undesired behavior more rapidly. Further, the intensity level of the applied correction is generally the minimum amount necessary to deter the animal from the undesired behavior, as determined from the response of the animal. Accordingly, there is a need to provide a method and apparatus for adjusting the intensity of a static stimulation applied to an animal as a deterrent.

BRIEF SUMMARY OF THE INVENTION

An apparatus and method for producing a variable intensity static stimulation, or variable static stimulation generator, is illustrated and described. The variable static stimulation generator produces a stimulus, such as a static stimulation, that increases in intensity if the animal continues to require correction. In one embodiment, the stimulus generation signal of the present invention is a periodic signal having constant amplitude and a constant duration. Varying the duty cycle of the stimulus generation signal changes the intensity of the static stimulation. By increasing the duty cycle such that more energy is introduced into the static stimulation during a fixed duration of time, the intensity of the static stimulation is increased.

BRIEF DESCRIPTION OF THE SEVERAL VIEWS OF THE DRAWINGS

The above-mentioned features of the present invention will become more clearly understood from the following detailed description of the invention read together with the drawings in which.

DETAILED DESCRIPTION OF THE INVENTION

An apparatus for producing a variable intensity static stimulation, or variable static stimulation generator, is illustrated generally at 10 in the figures. The stimulation unit 10 administers a stimulus, such as a static stimulation, that increases in intensity if the animal continues to require correction. In one embodiment, the stimulus generation signal of the present invention is a periodic signal having constant amplitude and a constant duration. Varying the duty cycle of the stimulus generation signal changes the intensity of the static stimulation. By increasing the duty cycle such that more peaks occur during a fixed duration of time, the area under the curve representing the total energy increases thereby increasing the intensity of the static stimulation.

Figure 1:
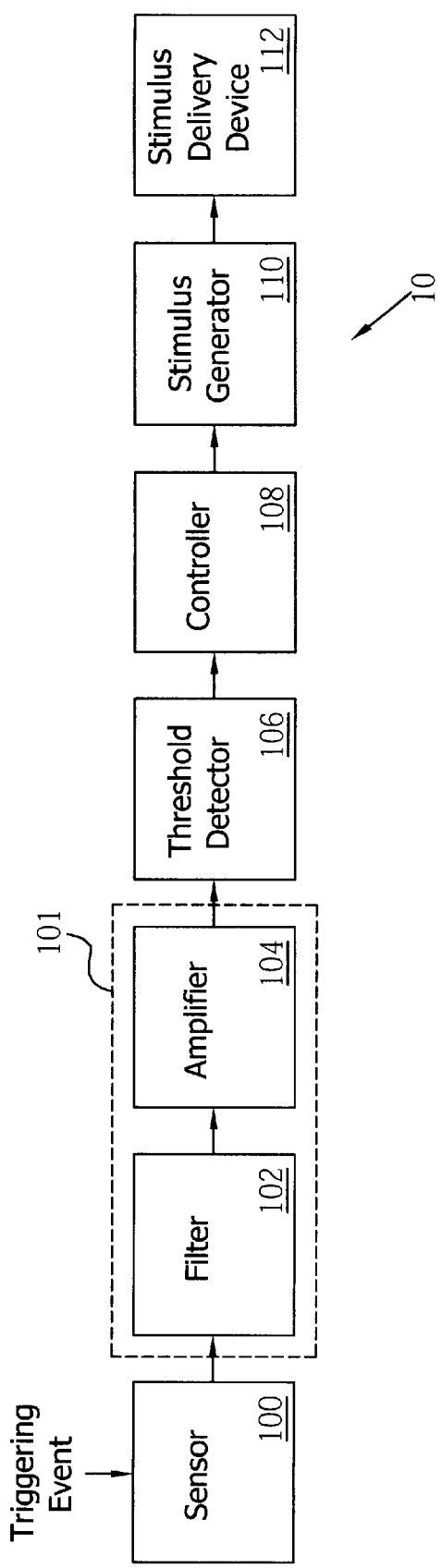
FIG. 1 illustrates a block diagram of an apparatus for producing a variable intensity static stimulation.

FIG. 1 illustrates a block diagram of an apparatus for generating a variable intensity static stimulation. The apparatus includes a sensor 100 responsive to a triggering event or condition. The various types of triggering events and conditions along with the specific circuitry associated with a particular event or condition are well known to those skilled in the art. By way of example, common triggering events and conditions include, but are not limited to, the barking of a dog detected by either a vibration sensor or a microphone or the receipt of a correction request signal generated from a remote transmitter of a pet containment or training system, which is generally accomplished through radio frequency or electromagnetic signals.

In its most general form, the sensor 100 detects a triggering event or condition that causes a stimulus to be administered to the pet through a stimulus activation signal. Those skilled in the art will recognize that the stimulus activation signal may be qualified by post processing depending upon the application. For example, in a simple remote trainer where a remote transmitter broadcasts a signal that is received by the simulation unit, no additional processing is necessary. The receipt of a signal by the stimulation unit results in a correction. However, in a slightly more complex remote training system, the received signal may be verified to insure that a stray signal does not cause an unintended/unnecessary correction. This may include frequency verification or the decoding of identification information embedded in the signal. For containment system applications, additional processing to determine the signal strength may be used to determine the proximity of the animal to the boundary. In a bark deterrent application, the signal may undergo checks to verify that the received signal is a bark and/or that the animal wearing the stimulation unit 10 produced the sound. These types of applications and the various methods and apparatuses for implementing the same are well known to those skilled in the art.

Upon detection of a triggering event or condition, the stimulation unit 10 produces a pulse train of fixed duration that includes a number of pulses having substantially equivalent magnitude and pulse widths. The number of pulses within the pulse train defines the total energy of the pulse train. By varying the number of pulses that occur within the fixed duration of the pulse train, the intensity of the stimulus generated from the pulse train is varied. Those skilled in the art can appreciate the various mechanisms for varying the number of pulses in a pulse train, such as timing the separation between pulses or varying the frequency of the signal. For reference, a pulse train is intended to include a series of pulses produced digitally through an analog continuous wave signal, where the signal peaks are considered pulses.

In the illustrated embodiment, the processing in a more complex application is provided as an example. The following example is not intended to limit the scope and spirit of the present invention. The output of the sensor is generally conditioned by a signal conditioning circuit 101. In the illustrated embodiment, the signal conditioning circuit 101 includes a filter circuit 102 for removing unwanted components of the sensor output and an amplifier 104 for increasing the level of the sensor output for further processing and accurate sampling. Those skilled in the art will recognize that the type of signal conditioning depends upon the input signal, the corresponding sensor and the desired characteristics of the input signal that are to be monitored. For example, the filter may be active or passive and may be set to pass a specific frequency range or remove high or low frequency noise. Further, depending upon the various components used, the output signal may not require additional amplification. Finally, other conditioning may be required to present a useable sensor output to the remainder of the circuit.

A threshold detector circuit 106 operates on the conditioned output to produce a result signal in a form useable by a controller 108 for further processing. In one embodiment, the threshold detector includes an analog-to-digital converter (ADC), which produces a digital result signal for use by a digital processor. In an alternate embodiment, the threshold detector produces an analog result that can be processed by analog logic. Those skilled in the art will recognize that the type of components used to implement the threshold detector and the controller depend on various factors including the cost of manufacture, size and weight constraints and the complexity of the decision process. For example, the size and weight of the training collar worn by the animal is reduced by implementing the controller in a single application specific integrated circuit (ASIC) or a microprocessor, both of which allow complex decision making capabilities. For lower cost, larger units implementing a simple decision tree, an array of discrete logic components can be used.

The controller 108 monitors the output of the sensor and produces a request for a stimulus generator 110 to generate a correction stimulus as necessary. In one embodiment, the stimulus generator 110 is a pulse transformer. Decision-making logic within the controller 108 determines whether a stimulus is needed. For example, where the controller 108 is a processing device including an internal timer, memory registers and math capabilities, the input to the controller is compared against a reference value to determine whether a stimulus is warranted. If so, an intensity level signal is generated at the controller output and passed to the stimulus generator. Those skilled in the art will recognize that the intensity level signal can be either a periodic waveform or a series of discrete pulses occurring within a predetermined time period. An example of the intensity level signal is provided in FIG. 2.

In one embodiment, the controller 108 includes a duration timer, a duty cycle timer, and a signal generator. When activated, the duration timer counts a fixed period of time, the duration period, during which the signal generator generates an intensity level signal. The duty cycle of the intensity level signal specifies the intensity of the stimulus produced by the stimulus generator 110. The duty cycle timer counts the "on" period of the intensity level signal and the "off" period of the intensity level signal to control the ratio of the "on" period of the intensity level signal to the duration of the stimulus. In an alternate embodiment, the duty cycle timer counts the separation between pulses, with the signal generator producing a fixed pulse upon the expiration of the duty cycle timer within the duration period of a stimulus. Those skilled in the art will recognize that the timers and signal generator can be implemented using various components, such as discrete components, both analog and digital, or a single integrated circuit or processor, without departing from the scope and spirit of the present invention.

Those skilled in the art will recognize that the most obvious choice for a type of stimulus that will benefit from variation of the stimulus intensity is a static stimulation; however, other stimuli can be used including, but not limited to, audible or ultrasonic sound, vibration or spray stimuli. The stimulus generator is connected to a stimulus delivery device, such as a pair of output terminals between which a static stimulation is produced, a speaker, a vibration generator or a spray mechanism and reservoir. The stimulus generator may include multiple types of stimulus generation devices to provide for a warning signal prior to the application of the stimulus.

Figure 2:
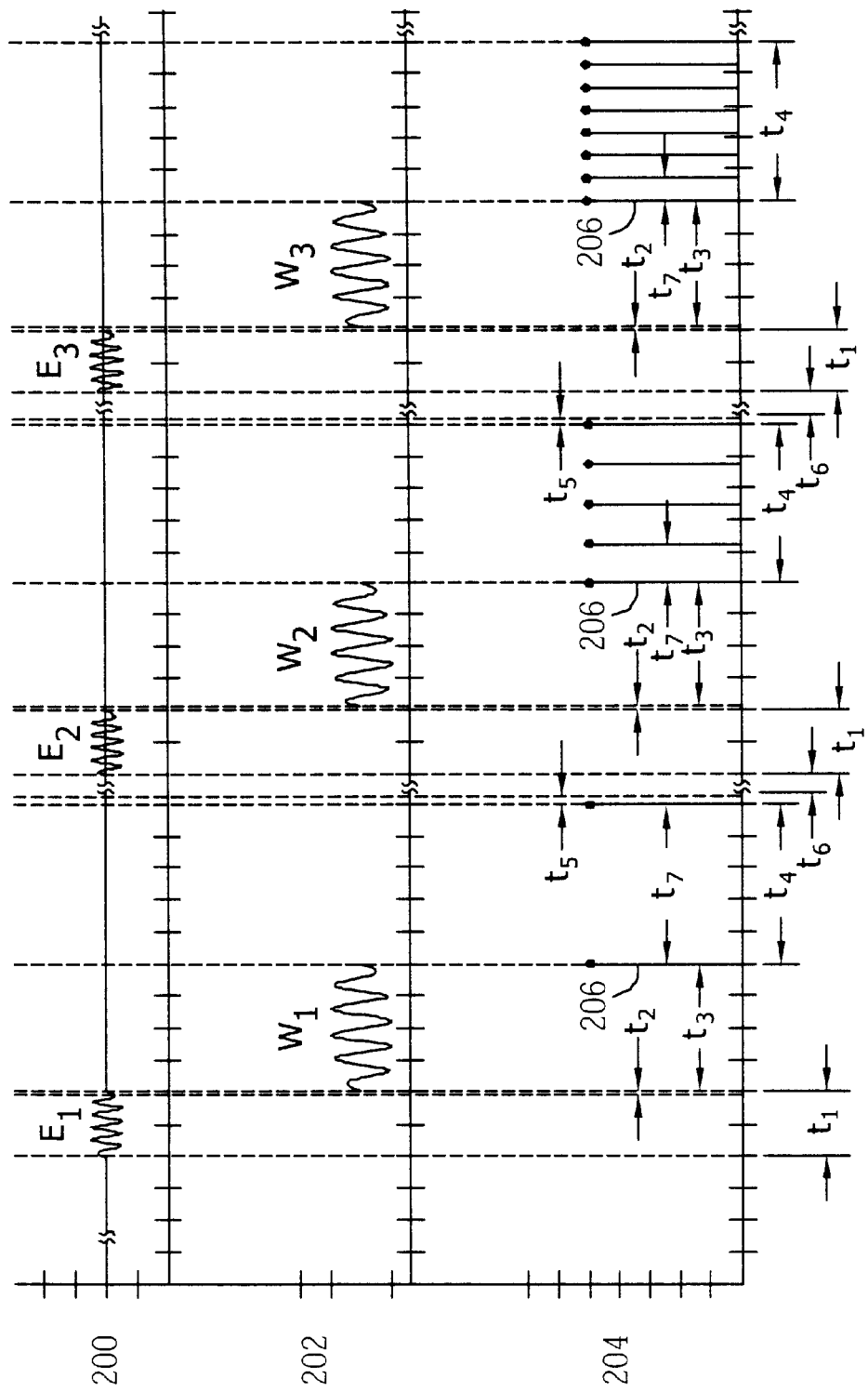
FIG. 2 is a timing diagram illustrating a sequence of signals produced by the apparatus of FIG. 1.

FIG. 2 is a timing diagram showing the output at three points in the apparatus of the present invention and the time periods that show the relation between the outputs. Graph 200 shows the sensor output, which represents the detection events. Graph 202 illustrates one output of the stimulus generator in the form of a warning signal. Graph 204 illustrates another output of the stimulus generator in the form of a varying intensity stimulus output produced by the present invention.

In the illustrated timing diagram, three detected events, $E_1$, $E_2$ and $E_3$, are shown. The time required to sample and measure the input signal is represented by period $t_1$. A warning signal, $W_1$, $W_2$ and $W_3$, follows each detected event that meets predetermined criteria, which indicates that a response is necessary. In one embodiment, as is typical of conventional electronic training systems, the warning signal is an audible deterrent, which provides an indication to the animal that a deterrent signal is to follow. During training, each warning signal becomes associated as a predecessor to the deterrent signal that follows. Once an animal is trained, the warning signal is often sufficient to stop the animal from continuing the undesired behavior so as to avoid receiving the stimulus. Those skilled in the art will recognize that other warning signals can be used without departing from the scope and spirit of the present invention.

Figure 3:
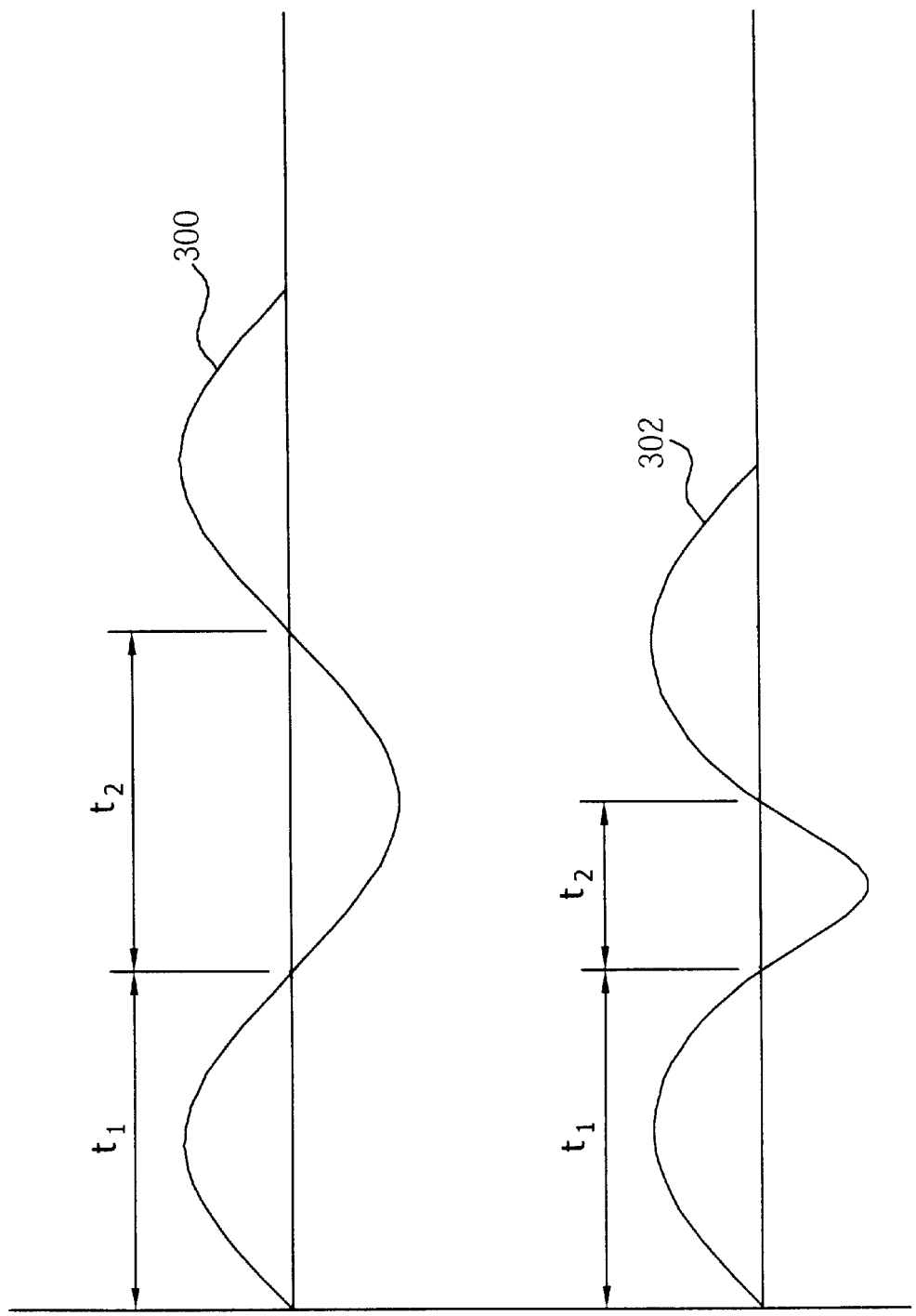
FIG. 3 is an illustration of an alternate embodiment of a pulse train including a synthesized continuous wave signal used to vary the intensity of the stimulus contrasted with a standard sine wave.

In the illustrated embodiment, a time delay between sampling and the beginning of the warning signal, represented by period $t_2$, is shown. Those skilled in the art will recognize that the time delay is not required by the present invention but may introduced as desired or as a result of characteristics or processing delays inherent in the components used to implement the apparatus. The duration of the warning signal is represented by period $t_3$. Subsequent to each warning signal, a stimulus, $S_1$, $S_2$ and $S_3$, occurs. In the illustrated embodiment, each stimulus S is characterized by a fixed duration that remains constant for any stimulus S produced by the variable static stimulation generator 10. The duration of the stimulus is represented by period $t_4$. Within the time period $t_4$ of each stimulus, a pulse train having a variable number of pulses 206 of equal magnitude imparts the energy that produces the static stimulation, which is applied to the animal. Those skilled in the art will recognize that the pulse train can be formed from any signal where the duty cycle, i.e., the ratio of the "on" period of the signal to the entire duration of the stimulus, is variable. For example, the pulse train can be formed from a variety of signals ranging from a plurality of discrete pulses that are digitally generated to a continuous wave signal where the frequency varies on the half cycle, which could be produced from a function generator, as illustrated in FIG. 3. FIG. 3 shows standard sine wave 300 where each half-cycle of the sine wave has an identical period, i.e., $t_1=t_2$, contrasted with a synthesized continuous wave 302 where each half cycle having different periods, i.e., $t_1<>t_2$, such that the duty cycle varies thereby varying the intensity of the resulting static stimulation.

Returning now to FIG. 2, as illustrated, the intensity of each subsequent stimulus is greater than the preceding stimulus, as shown by the greater number of pulses 206 that occur within the duration of a single stimulus S. Those skilled in the art will recognize that, depending upon the activities of the animal, the objects of the electronic training device and the underlying training philosophy, the intensity of a given stimulus could be reduced from or remain constant with the intensity of the preceeding stimulus. The time between each pulse 206 within a single stimulus $S_n$ is represented by the pulse period, $t_7$.

After the final pulse in each stimulus, the time delay that occurs before the next input signal can be sampled is represented by period $t_5$. Again, this delay is not required for proper operation, but may be introduced intentionally or through properties or limitations of the components used. When the system is ready to process a new input signal, a timer begins counting the time period, represented by the period $t_6$, between the end of the previous stimulus S and the next detected event E. The length time between the previous event and the next subsequent event determines whether the intensity is increased or remains constant. In one embodiment, when the next subsequent event occurs within a predetermined period of time relative to the previous event, the reoccurrence period, the intensity of the stimulus is increased. This occurs because the rapid repetition of the undesired behavior indicates that the previous stimulus did not have sufficient intensity to deter the animal from continuing in the unwanted behavior. However, when the next subsequent event occurs after the expiration of the reoccurrence period, the intensity of stimulus remains at the prior intensity level.

Those skilled in the art will recognize that timing decisions abound depending upon the objects of the training or containment system. As mentioned, the system generally increases the intensity each time a new event occurs within the reoccurrence period of the last event. However, the system can implement an adaptive correction scheme customized to a particular animal. For example, the system can reset to a baseline deterrent that is established for a particular animal by analyzing historical information as to the effective intensity level. Once the effective intensity level is known, the baseline is established relative to that level, perhaps one or more levels below the effective intensity level. Alternatively, the system may reset entirely if no events occur within a significant period of time. The choice of correction scheme can affect the hardware and software implementation of the apparatus but does not alter the underlying method of varying the intensity of the correction stimulus by changing the duty cycle of the correction signal applied over a fixed duration. Accordingly, any such modifications are considered to fall within the scope and spirit of the present invention.

A number of additional features can be included without departing from the scope and spirit of the present invention. For example, a time-out feature is implemented in the controller to prevent the excessive correction of the animal. The time-out feature involves the monitoring of the stimulus applied to the animal and stopping all corrections in the event the corrections exceed a predetermined time. This prevents an animal from experiencing an excessive correction as result of cruelty where the correction is induced by a person, malfunction of the system and especially aggravating circumstances that incite the animal or prevent the animal from moving out of the range the stimulus activation signal, perhaps extreme pain from an injury. These types of conditions are well known to those skilled in the art and the specific mechanism for prevention depends upon the type of system.

Figure 4:
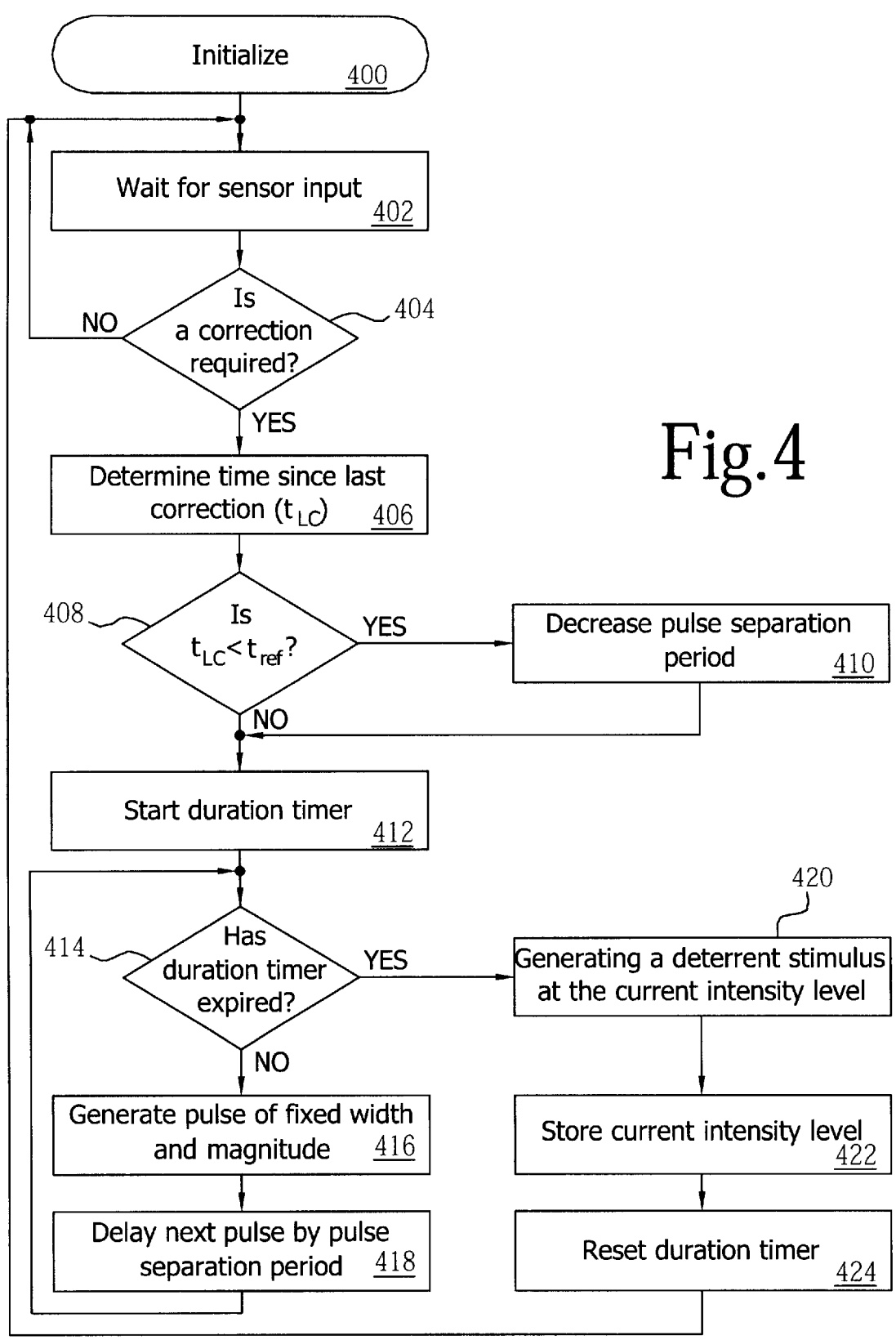
FIG. 4 is a flow diagram illustrating a method of the producing a variable intensity static stimulation.

FIG. 4 illustrates a flow diagram of the method of generating a variable intensity static stimulation. In step 400, the apparatus is initialized to assume an infinite time since last correction and set to an initial intensity level. In step 402, the apparatus waits for the sensor to detect an input signal and produce a sensor output. In step 404, the controller receives the sensor output and determines whether the sensor output indicates a condition exists or an event has occurred that requires correction. If no correction is required for the sensor output, the apparatus returns to step 402 to await the next input. However, when a condition exists or correction event occurs that requires correction, the controller obtains the time since last correction, $t_{LC}$, in step 406. In step 408, the time since last correction is compared to a reference time, $t_{ref}$, to determine whether the two corrections occurred sufficiently close in time to one another to require an increase in the current intensity level. If the time since last correction is less than the reference time, the time between pulses, or the pulse separation period, is decreased so that more pulse will be produced during a fixed period of time, in step 410. Otherwise, the pulse separation period remains constant and the deterrent signal generator is activated.

In step 412, a duration timer begins counting the fixed duration of stimulus. The duration timer is checked against the fixed duration time, in step 414. If the time remaining on the duration timer has not expired, then a new pulse, which has a fixed pulse width and fixed magnitude, is generated in the pulse train, in step 416. Next a delay between the trailing edge of the current pulse and the leading edge of the next subsequent pulse in the pulse train is timed to control the duty cycle, as in step 418 and the program returns to step 414 to again evaluate the duration timer.

If no time remains on the duration timer, an electric static stimulation having an intensity based on the pulse train is produced, in step 420. The current intensity level is stored for subsequent use, in step 422. The duration timer is reset, in step 424, and the program returns to step 402 to wait for a new sensor input. Those skilled in the art will recognize that the order of many of the steps in the method described above is not critical to the scope and spirit of the present invention. Further, those skilled in the art will recognize the obvious equivalents to the steps of the method described. For example, the time since last correction could be tested to see if it exceeded a reference time and the resulting actions reversed from those described.

While a preferred embodiment has been shown and described, it will be understood that it is not intended to limit the disclosure, but rather it is intended to cover all modifications and alternate methods falling within the spirit and the scope of the invention as defined in the appended claims.

I claim:

1. An apparatus for training an animal, said apparatus comprising:
   a stimulation unit for administering a stimulus to an animal;
   a sensor for detecting a stimulation activation signal; and
   a controller for processing said stimulation activation signal and producing a fixed duration pulse train having a number of pulses of substantially equivalent magnitude, said controller varying said number of pulses in said pulse train, said stimulus having an intensity directly related to said number of pulses in said pulse train.

2. The apparatus of claim 1 wherein the controller deactivates said stimulation unit after a selected number of said pulses occur within a predetermined time interval.

3. The apparatus of claim 1 wherein each said pulse has a substantially equivalent pulse width.

4. A method for training an animal, said method comprising the steps of:
   (a) receiving a stimulus activation signal;
   (b) selecting an intensity level for a stimulus to be applied to the animal;
   (c) producing a pulse train of fixed duration in response to stimulus activation signal, said pulse train including a number of pulses of substantially equal magnitude;
   (d) varying said number of pulses based on said intensity level;
   (e) converting said pulse train into a stimulus; and
   (f) applying said stimulus to the animal;
      whereby said stimulus has an intensity based on said number of pulses in said pulse train.

5. The method of claim 4 wherein each said pulse has a substantially equivalent pulse width.

6. The method of claim 4 further comprising the step of preventing said step of applying said stimulus to the animal for a first predetermined period of time after a predetermined plurality of said deterrent stimuli have been applied to the animal within a second predetermined period of time.

7. A method for producing a stimulus having a variable intensity, the stimulus being applied to an animal, said method comprising the steps of:
   (a) setting a duration of the stimulus to a fixed time period;
   (b) setting a magnitude of the stimulus to a fixed value;
   (c) selecting a desired intensity level;
   (d) setting a pulse separation period to a value based upon said desired intensity level, said pulse separation period being less than said fixed time period; and
   (e) producing at least one pulse, each said at least one pulse followed by said pulse separation period during which no pulse is produced;
      whereby a variable intensity stimulus is generated, the intensity of said stimulus being inversely related to the length of said pulse separation period.

8. The method of claim 7 wherein said stimulus is selected from the group consisting of an electrostatic stimulation, an audible stimulation, an ultrasonic stimulation, a vibratory stimulation, and a spray stimulation.

9. The method of claim 7 wherein each said at least one pulse has a substantially equivalent pulse width.

10. A method for producing a stimulus having a variable intensity, the stimulus being applied to an animal, said method comprising the steps of:
    (a) producing a periodic signal of fixed magnitude for a fixed duration;
    (b) varying a duty cycle of said periodic signal;
    (c) converting said periodic signal into an electrical static stimulation; and
    (d) applying said electrical static stimulation to the animal;
       whereby said static stimulation has an intensity directly related to said duty cycle.

11. The method of claim 10 wherein each peak of said periodic signal has a substantially equivalent magnitude.

12. The method of claim 10 wherein each peak of said periodic signal has a substantially equivalent width.

13. The method of claim 10 further comprising the step of preventing said step of applying said electrical static stimulation for a first predetermined period of time after a substantially continuous plurality of said electrical static stimulations have been applied to said animal within a second predetermined time.

14. An apparatus for producing a stimulus having a variable intensity, the stimulus being applied to an animal, said apparatus comprising:
    a duration timer for counting a duration period of the stimulus, said duration period being substantially equal with respect to any stimulus;
    a pulse separation period selector, said pulse separation period selector setting a separation period, said separation period being less than said duration period;
    a pulse separation timer for repeatedly counting said separation period;
    a pulse generator in communication with said duration timer, said pulse generator producing at least one pulse, each said at least one pulse being substantially equal in magnitude with respect to each other said at least one pulse, said pulse generator producing said at least one pulse during said duration period, each said at least one pulse being generated upon expiration of said pulse separation timer; and
    a transformer in electrical communication with said pulse generator, said transformer integrating each said at least one pulse produced during said duration period into a static stimulation;
    whereby said static stimulation has an intensity inversely related to said separation period.

15. An apparatus for producing a stimulus having a variable intensity, the stimulus being applied to an animal, said apparatus comprising:
    means for receiving a stimulation activation signal;
    means for producing a pulse train in response to said stimulation activation signal, said pulse train including a number of pulses;
    means for varying said number of pulses in said pulse train;
    means for integrating said pulse train into a stimulus; and
    means for applying said stimulus to the animal;
    whereby said stimulus has an intensity directly related to said number of pulses in said pulse train.

16. The apparatus of claim 15 further comprising means for providing said pulse train with a fixed duration.

17. The apparatus of claim 15 further comprising means for providing each said pulse with a substantially equivalent magnitude.

18. The apparatus of claim 15 further comprising means for providing each said pulse with a substantially equivalent width.

19. The apparatus of claim 15 wherein said stimulus is an electrical static stimulation.

20. The apparatus of claim 15 further comprising means for preventing excessive application of said stimulus to the animal.

21. An apparatus for training an animal, said apparatus comprising:
- a stimulation unit for administering a stimulus to an animal, said stimulus selected from the group consisting of an electrostatic stimulation, an audible stimulation, an ultrasonic stimulation, a vibratory stimulation, and a spray stimulation;
- a sensor for detecting a stimulation activation signal; and
- a controller for processing said stimulation activation signal and producing a fixed duration pulse train having a number of pulses of substantially equivalent magnitude, said controller varying said number of pulses in said pulse train, said stimulus having an intensity directly related to said number of pulses in said pulse train.

22. A method for training an animal, said method comprising the steps of:
- (a) receiving a stimulus activation signal;
- (b) selecting an intensity level for a stimulus to be applied to the animal;
- (c) producing a pulse train of fixed duration in response to stimulus activation signal, said pulse train including a number of pulses of substantially equal magnitude;
- (d) varying said number of pulses based on said intensity level;
- (e) converting said pulse train into a stimulus, said stimulus selected from the group consisting of an electrostatic stimulation, an audible stimulation, an ultrasonic stimulation, a vibratory stimulation, and a spray, stimulation; and
- (f) applying said stimulus to the animal;
    whereby said stimulus has an intensity based on said number of pulses in said pulse train.

* * * * *